(12) United States Patent
Minervini et al.

(10) Patent No.: US 11,341,417 B2
(45) Date of Patent: May 24, 2022

(54) METHOD AND APPARATUS FOR COMPLETING A KNOWLEDGE GRAPH

(71) Applicant: Fujitsu Limited, Kawasaki (JP)

(72) Inventors: Pasquale Minervini, Galway (IE); Luca Costabello, Galway (IE); Emir Fernando Muñoz Jiménez, Galway (IE); Vit Nováček, Galway (IE); Pierre-Yves Vandenbussche, Galway (IE)

(73) Assignee: FUJITSU LIMITED, Kawasaki (JP)

( * ) Notice: Subject to any disclaimer, the term of this patent is extended or adjusted under 35 U.S.C. 154(b) by 1178 days.

(21) Appl. No.: 15/821,088

(22) Filed: Nov. 22, 2017

(65) Prior Publication Data

US 2018/0144252 A1 May 24, 2018

(30) Foreign Application Priority Data

Nov. 23, 2016 (DE) .......................... 102016223193.6

(51) Int. Cl.
| | |
|---|---|
| *G06F 15/16* | (2006.01) |
| *G06F 9/54* | (2006.01) |
| *H04L 29/06* | (2006.01) |
| *G06N 5/02* | (2006.01) |
| *G06F 40/30* | (2020.01) |
| *G06F 40/247* | (2020.01) |
| *G06F 9/50* | (2006.01) |

(52) U.S. Cl.
CPC .............. *G06N 5/02* (2013.01); *G06F 9/5005* (2013.01); *G06F 40/247* (2020.01); *G06F 40/30* (2020.01)

(58) Field of Classification Search
CPC ................................. G06N 5/02; G06F 9/5005

USPC .......................................................... 706/56
See application file for complete search history.

(56) References Cited

U.S. PATENT DOCUMENTS

| | | | |
|---|---|---|---|
| 9,037,464 B1 | 5/2015 | Mikolov et al. | |
| 11,042,531 B2* | 6/2021 | Stoilos | .................... G06N 5/022 |
| 2009/0012842 A1* | 1/2009 | Srinivasan | .............. G06F 40/30 |
| | | | 705/12 |
| 2011/0191374 A1 | 8/2011 | Bengio et al. | |
| 2014/0282586 A1* | 9/2014 | Shear | ................ G06F 16/24575 |
| | | | 718/104 |

(Continued)

OTHER PUBLICATIONS

Learning Entity and Relation Embeddings for Knowledge Graph Completion Yankai Lin1, Zhiyuan Liu1*, Maosong Sun 1,2 (Year: 2015).*

(Continued)

*Primary Examiner* — Hamza N Algibhah
(74) *Attorney, Agent, or Firm* — Staas & Halsey LLP

(57) ABSTRACT

A method, apparatus and program for completing a knowledge graph from a plurality of predicates and associated entities, the predicates each providing information on a relationship between a pair of entities, the method comprising the steps of: receiving an input comprising the plurality of predicates and associated entities; searching an axiom database and identifying predicates among the plurality of predicates that are equivalent to one another, or inverses of one another; identifying further predicates that are related to one another, using the axiom database and identified predicates; and embedding the identified predicates and associated entities into a vector space to complete the knowledge graph.

10 Claims, 6 Drawing Sheets

(56) References Cited

U.S. PATENT DOCUMENTS

| | | | |
|---|---|---|---|
| 2014/0337306 A1* | 11/2014 | Gramatica | G06F 16/2471 707/706 |
| 2015/0095017 A1 | 4/2015 | Mnih et al. | |
| 2017/0132329 A1* | 5/2017 | Yakout | G06F 16/9024 |
| 2017/0161311 A1* | 6/2017 | Clark | G06F 16/9024 |
| 2017/0270124 A1* | 9/2017 | Nagano | G06F 16/24575 |
| 2017/0308620 A1* | 10/2017 | Cao | G06F 16/24542 |
| 2018/0011903 A1* | 1/2018 | Abolhassani | G06F 16/243 |
| 2018/0018576 A1* | 1/2018 | Boyer | G06N 20/00 |
| 2021/0173711 A1* | 6/2021 | Crabtree | G06Q 10/067 |

OTHER PUBLICATIONS

Open-World Knowledge Graph Completion Baoxu Shi, Tim Weninger (Year: 2018).*

Minervini, et al., "Regularizing Knowledge Graph Embeddings via Equivalence and Inversion Axioms," Proceedings of European Conference on Machine Learning and Knowledge Discovery in Databases, vol. 10534, Ch. 40, No. 558, Sep. 18-22, 2017, XP047459411, pp. 668-683.

Extended European Search Report dated Apr. 16, 2018, in corresponding European Patent Application No. 17201904.4, 7 pgs.

Lehmann, J. et al., "DBpedia—A Large-scale, Multilingual Knowledge Base Extracted from Wikipedia", 2012, IOS Press, pp. 1-29.

Wu, F. et al., "Structured Embedding via Pairwise Relations and Long-Range Interactions in Knowledge Base", Proceedings of the Twenty-Ninth AAAI Conference on Artificial Intelligence, 2015, Association for the Advancement of Artificial Intelligence, pp. 1663-1670.

Bordes, A. et al., "Translating Embeddings for Modeling Multi-relational Data", 2013, NIPS Proceedings, pp. 1-9 retrieved from http://papers.nips.cc/paper/5071-translating-embeddings-for-modeling-multi-rela.

Yang, B. et al., "Embedding Entitles and Relations for Learning and Inference in Knowledge Bases", ICLR, 2015, pp. 1-13.

Trouillon, T et al., "Complex Embeddings for Simple Link Prediction", *Proceedings of the 33rd International Conference on Machine Learning*, New York, NY, 2016, JMLR: W&CP vol. 48, 10 pages.

Dong, X. et al., "Knowledge Vault: A Web-Scale Approach to Probabilistic Knowledge Fusion", *KDD*, 2014, 10 pages.

Nickel, M. et al., "Reducing the Rank of Relational Factorization Models by Including Observable Patterns", 2014, NIPS Proceedings, pp. 1-9 retrieved from https://papers.nips.cc/paper/5448-reducing-the-rank-in-relational-factorization-by-including-observable-patterns.

Rocktäschel, T. et al., "Injecting Logical Background Knowledge into Embeddings for Relation Extraction", *Human Language Technologies: The 2015 Annual Conference of the North American Chapter of the ACL*, Denver, Colorado, May 31-Jun. 5, 2015, pp. 1119-1129.

Wang, Q. et al., "Knowledge Base Completion Using Embeddings and Rules", Proceedings of the Twenty-Fourth International Joint Conference on Artificial Intelligence (IJCAI 2015), 2015, pp. 1859-1865.

Minervini, P. et al., "Leveraging the Schema in Latent Factor Models for Knowledge Graph Completion", SAC 2016, Apr. 4-8, 2016, Pisa, Italy, 6 pages.

Krompaβ, D. et al., "Large-Scale Factorization of Type-Constrained Multi-Relational Data", 2014 International Conference on Data Science and Advanced Analytics (DSAA), Oct. 31-Nov. 1, 2014, IEEE, 7 pages.

Chang, K. et al., "Typed Tensor Decomposition of Knowledge Bases for Relation Extraction", *Proceedings of the 2014 Conference on Empirical Methods in Natural Language Processing (EMNLP)*, Oct. 25-29, 2014, Doha, Qatar, pp. 1568-1579.

Bengio, Y. et al., "Representation Learning: A Review and New Perspectives", Cornell University Library, Oct. 18, 2012, pp. 1-34 retrieved from https://arxiv.org/abs/1206.5538v2.

* cited by examiner

METHOD AND APPARATUS FOR COMPLETING A KNOWLEDGE GRAPH

CROSS-REFERENCE TO RELATED APPLICATIONS

This application claims the benefit of German Application No. 102016223193.6, filed Nov. 23, 2016, in the German Intellectual Property Office, the disclosure of which is incorporated herein by reference.

The invention relates to a method and apparatus for completing a knowledge graph. Also disclosed are a computer program which, when executed by a computer, causes the computer to perform the method for completing a knowledge graph, and a non-transitory computer readable medium comprising the computer program.

In recent years the use of knowledge graphs to represent relationships between data entries in an intuitively understandable way has increased. Knowledge graphs essentially represent multiple statements (forming a knowledge base) in a graphical form. In knowledge graphs, a collection of entities and predicates are represented, usually in the form of a multi-dimensional plot. The entities can be almost anything, examples include persons, locations, physical objects, electronic files, abstract concepts, and so on. Relationships between entities (predicates) can be illustrated using links between the entities. The relative positioning of the entities and links on the knowledge graph can also be used to illustrate relationships between different entities and links.

Knowledge Graphs (KGs) are powerful instruments in search, analytics, generation of recommendations, and data integration. Large scale KGs have been developed and used both by industry and academia. As such, it is desirable to provide more accurate and less labour intensive methods for completing knowledge graphs.

The principles used to form knowledge graphs are best illustrated by way of example. Given the initial information "New York City (NYC) is a city (CITY) in New York State (NEW YORK STATE), which also contains Albany (ALBANY)", it is possible to extract relationships which can be entered into a knowledge graph. These relationships can be expressed in the form <entity, predicate, entity>, or <subject, predicate, object> (also referred to as <s,p,o>). The second of these forms can form a Resource Description Framework (RDF) triple, that is, a predicate and a pair of associated entities provided in a form that complies with the Resource Description Framework requirements.

From the initial information provided above, it is possible to extract three statements of relationships. An example of an extractable statement of relationship, in the form of a triple (specifically a RDF triple) is <NYC, TYPE OF, CITY>, that is, the entity NYC is of the type City. The three statements of relationships that can be extracted from the initial information are shown in Table 1 below in the form of triples.

TABLE 1

| Subject | Predicate | Object |
| --- | --- | --- |
| NYC | TYPE OF | CITY |
| NYC | PART OF | NEW YORK STATE |
| NEW YORK STATE | HAS PART | ALBANY |

As mentioned above, any given entity can be the subject or object of an RDF triple, while the predicates form a separate set. The data used to complete a knowledge graph (including but not limited to a graph formed in accordance with RDF requirements) can be described in terms of the sets of entities and predicates. From the data shown in Table 1 it is possible to form a set E of the entities, and a set R of the predicates (relationships between entities). The constitution of sets E and R is shown below in Equation 1.

$$E=\{NYC, CITY, NEW\ YORK\ STATE, ALBANY\}$$

$$R=\{TYPE\ OF, PART\ OF, HAS\ PART\} \quad \text{Equation 1}$$

Using the sets E and R as shown in Equation 1, a further set S can be defined, where S is the set comprising all of the possible <entity, predicate, entity>, or <subject, predicate, object> statements that can be formed using the data in sets E and R. S is therefore defined as shown in Equation 2 below.

$$S=E\times R\times E \quad \text{Equation 2}$$

From a comparison between set S and the initial information from which the relationships in Table 1 were derived, it is clear that the initial information does not allow all of the possible statements in set S to be directly derived. An example of a statement which cannot be verified from the initial information is the type of Albany. The initial information provides that NYC is a city, which is in New York State, and that Albany is also in New York State. However, the initial information does not include whether Albany is a city or not. That is, there is no initial information on the veracity of the statement <ALBANY, TYPE OF, CITY>.

In a knowledge graph constructed using a closed world assumption, the absence of information on whether Albany is a city or not would be interpreted as meaning that the relationship is not correct, that is, <ALBANY, TYPE OF, CITY> is false. This assumption is more likely to be valid if the set of initial information is complete. However, the majority of knowledge graphs are generated from data sets that are known or believed to be incomplete, and therefore it is more appropriate to use an open world assumption.

Under an open world assumption, the absence of information on whether Albany is a city or not is not interpreted as meaning that the relationship is not correct. Instead, it is unknown whether or not Albany is a city. That is, the validity of <ALBANY, TYPE OF, CITY> is unknown. The open world assumption is typically a more realistic requirement for real world data sets, and the Resource Description Framework requirements specify the use of the open world assumption. However, use of the open world assumption means that the validity of at least some of the statements in the set S is very likely to be unknown.

The valid statements from the set S can be represented using a labelled directed multi-graph, wherein each statement is represented as an edge connecting two nodes representing the entities. In order to allow missing edges to be added (representing statements from the set S for which the validity is not known), it is useful to consider the relationships between predicates. In this way, statements for which the validity is not known may be included in the labelled directed multi-graph, when the validity of the statements can be deduced by analysing the statements directly supported in the initial information.

A technique for constructing knowledge graphs is to map the statements S to vectors in a multi-dimensional vector space. In addition to providing a useable representation of a potentially large number of statements, this mechanism also allows relationships between different statements to be indicated, if such relationships are known. Examples of the types of relationships that may be indicated include equivalence relationships and inverse relationships, both of which are discussed below with reference to examples of relationships between people.

An example of equivalent relations consists in the pair of relations (predicates) Works With and Colleague Of: given a RDF triple <s, Works With, o>, the triple <s, Colleague Of, o> is also very likely to be true, since the two relations have the same (or very similar) meanings. A similar case holds, for instance, for the case Married With and Partner Of: although not equivalent they have related meanings, and if <s, Married With, o> is true, then <s, Partner Of, o> is more likely to also be true. However, although <s, Partner Of, o> is more likely to also be true in this situation, the probability of validity is not as high as if the two predicates were exact equivalents of one another.

An example of inverse relations consists in the pair of relations (predicates) Has Part and Part Of: given a RDF triple <s, Has Part, o>, the triple <o, Part Of, s> is also very likely to be true, since the two relations are inverses of one another.

The relationships between predicates (equivalence, inverse, how closely related, etc.) are collectively known as the schema knowledge. The schema knowledge is generally not constrained to particular statements, because the relationships between the predicates are generally not dependent on the entities associated with the predicates. For example, the inverse relationship between the predicates Part Of and Has Part holds equally regardless of whether the related entity pairs are an orange and an orange segment, or New York and New York State.

Although knowledge graphs may be configured to indicate schema knowledge, this is not generally applied for larger data sets. The primary reason for this is that the inclusion of schema knowledge in knowledge graphs generates scalability issues, as a result of which the amount of work required to include information in a knowledge graph can increase exponentially with the amount of information to be included. As a result, schema-unaware knowledge graphs are common.

FIG. 1A shows an example of a schema unaware embedding, in which the predicates t1, t2, t3, tx and ty have been embedded in the vector space at random (with no consideration of relationships between the predicates). The relative positioning of the vectors 120 representing different predicates in FIG. 1A does not convey any useful information on the relevant schema knowledge.

There are two existing mechanisms by which schema knowledge can be incorporated within knowledge graphs: by pre-processing of the information to be included in the knowledge graphs; and by post-processing of the information to be included in the knowledge graphs. FIG. 1B shows how the application of the relevant schema knowledge 110 to the predicates t1, t2, t3, tx and ty alters the form of the resulting embeddings 130. As can be seen from FIG. 1B, the equivalence of the statements is illustrated by the clustering of the vectors 130 in the resulting (schema aware) knowledge graph.

In the application of pre-processing to the statements forming a knowledge graph, the statements are updated prior to assigning any embedding vectors for the knowledge graph. As an example of this, in the case of "equivalent" relations, for all the triples matching the pattern <s, Partner Of, o>, a triple <s, Married To, o> could be added to the knowledge graph. Similarly, in the case of "inverse" relations, for all the triples matching the pattern <s, Has Part, o>, a triple <o, Part Of, s> could be added to the knowledge graph. For post-processing application, predictions (inferences) are made after the statements have been added to the knowledge graph, and these predictions are used to adjust the vectors applied to the statements. The predictions are formulated as a mathematical optimisation problem (specifically an Integer Linear Programming, ILP, problem) such that final prediction scores are a trade-off between the prediction scores provided by Knowledge Graph embeddings, and compliance to logical constraints imposed by the method. An example of a post-processing application is described in "Knowledge base completion using embeddings and rules", by Wang, Q. et al., Proc. of the $24^{th}$ IJCAI, 2015, pgs. 1859 to 1865.

FIG. 2 is a process flow illustrating how both of the existing mechanisms by which schema knowledge can be incorporated within knowledge graphs can be use when embedding statements (in the form of triples) into a knowledge graph. As shown in FIG. 2, the schema knowledge 210 can be used to update the triples 212-1 to 212-n before embedding by an embedding computation system 211 in the knowledge graph (pre-processing, see 210-A). Alternatively, the schema knowledge 210 can be used to make the (schema unaware) embedding of the triples 212-1 to 212-n into the knowledge graph that has been computed by the embedding computation system 211 compliant to logical constraints (post-processing 210-B. In either case, the parameters of the model which serve to embed the triples into the knowledge graph are generated after the application of the schema knowledge.

When adding schema knowledge to an embedding model, the primary issues to be addressed are the accuracy of the addition of the schema knowledge, and the scalability of the mechanism used to add the knowledge. In particular, it is desirable to ensure that the knowledge graph embeddings comply with available Schema knowledge. As an example of this, <s, Has Part, o> and <o, Part Of, s> should be assigned equal scores. Equally, predicates that are similar such as "Colleague Of" and "Works With"—which have similar but not identical meanings—should be assigned similar embedding vectors. Any method used in schema knowledge addition should also be able to accommodate both exact and approximate inverse and equivalence relations, such as <Partner Of, Equivalent, Married With>

As the size of input information sets increases, the likelihood of an error being present in the input information also increases. It is therefore desirable that a method used in schema knowledge addition should be robust to errors. However, the primary issue with increasing size of input information is the scalability of schema knowledge addition mechanisms. Input information sets including many million pieces of information are not unheard of, for example, the DBpedia knowledge base (as discussed in "A Large-scale, Multilingual Knowledge Base Extracted from Wikipedia" by Lehmann, J. et al., Semantic Web Journal, Vol. 6, No. 2, pgs. 167-195) comprises over 400 million Resource Description Framework statements relating to 3.7 million entities, utilising the English language alone. Therefore, it is desirable for any mechanism for adding schema knowledge to be scalable to large data sets.

As mentioned above, both pre-processing and post-processing approaches for applying schema knowledge when embedding statements suffer from issues, in particular in relation to scalability of the methods employed. Schema-unaware embedding models usually map semantically close predicates to very different embedding vectors (the mapping is essentially random), thus not using such schema knowledge to improve the correctness of the embeddings. This can be solved by pre-processing the input statements, but this approach does not scale to large knowledge graphs as a result of the requirement for manual review of the dataset. While this may be practical for smaller input information sets, the scale of larger input information sets such as DBpedia (as discussed above) renders this approach entirely impractical.

Post-processing methods can reduce the requirement for manual intervention relative to pre-processing. This can be achieved by imposing a set of constraints on every possible fact, so to reflect available Schema Knowledge, when learning the embedding vectors for each entity and predicate in the Knowledge Graph (as discussed in "Knowledge base completion using embeddings and rules", cited above). However, this method requires that the number of constraints grows exponentially with the number of entities and relations in the Knowledge Graph, again causing scaling issues when applied to larger data sets.

It is therefore desirable to provide a method and apparatus for completing a knowledge graph from a plurality of predicates and associated entities, including schema knowledge, which is both accurate and scalable.

SUMMARY OF INVENTION

An aspect of an embodiment of the present invention provides a method for completing a knowledge graph from a plurality of predicates and associated entities, the predicates each providing information on a relationship between a pair of entities, the method comprising the steps of: receiving an input comprising the plurality of predicates and associated entities; searching an axiom database and identifying predicates among the plurality of predicates that are equivalent to one another, or inverses of one another; identifying further predicates that are related to one another, using the axiom database and identified predicates; and embedding the identified predicates and associated entities into a vector space to complete the knowledge graph, wherein the predicates and associated entities are assigned vectors in the embedding such that a penalty function sum, which is the sum of penalty function values for all of the predicates and associated entities, is minimised, the penalty function values being: inversely proportional to the similarity between assigned vectors for two predicates identified as being equivalent to one another; directly proportional to the dissimilarity between assigned vectors for two predicates identified as inverses of one another; and weighted according to the degree of correlation between predicates that are identified as being related. The method provides an accurate and (computing) resource efficient method and apparatus for completing knowledge graphs.

A further aspect of an embodiment of the present invention provides a method wherein the plurality of predicates and associated entities are utilized in the form of Resource Description Framework statements, and each Resource Description Framework statement is of the form <subject, predicate,object> the subject and object being entities and the predicate describing the relationship between the subject and object. Research Description Framework statements are a commonly used and understood form of predicates and entities that are compatible with and used in a broad range of databases.

A further aspect of an embodiment of the present invention provides a method wherein the absence of a given Resource Description Framework statement from the information used to complete the knowledge graph is not automatically interpreted as meaning that the given Resource Description Framework is false. The open world assumption is a more accurate representation of the majority of datasets than other alternatives.

A further aspect of an embodiment of the present invention provides a method comprising analysing the Resource Description Framework statements that are to be used to complete the knowledge graph and identifying Resource Description Framework statements that are absent; determining which of the identified absent Resource Description Statements is likely to be false based on the analysis; and adjusting the embedding of the Resource Description Framework entities and predicates that are to be used to complete the knowledge graph on the basis of the determination. The generation of negative examples in this way further increases the speed and accuracy with which the knowledge graph can be completed.

A further aspect of an embodiment of the present invention provides a method wherein the penalty function sum is of the form:

$$R_S(\Theta) = \Sigma_{p=q \in A_1} D(e(p) \| e(q)) \Sigma_{p=q^- \in A_2} D(e(p) \| \phi(e(q)))$$

wherein: $\Theta$ is the parameters of the model used to complete the knowledge graph; p and q are predicates; $A_1$ is a set containing all of the schema equivalence axioms; $A_2$ is a set containing all of the schema inverse axioms; e(x) is the embedding vector of x; $\phi$ is a model dependent transformation function; and $D(x \| y)$ is a measure of the dissimilarity between two given vectors x and y. This form of the penalty function sum can be used to efficiently identify the optimal model parameters for the knowledge graph.

A further aspect of an embodiment of the present invention provides a method comprising storing the set of assigned vectors found to minimise the penalty function sum. This allows the assigned vectors to be easily and quickly accessed for future utilisation.

A further aspect of an embodiment of the present invention provides a method further comprising identifying additional predicates based on the set of assigned vectors found to minimise the penalty function sum, and updating the axiom database using the additional predicates. The identification of additional predicates in this way facilitates the completion of databases.

A further aspect of an embodiment of the present invention provides a method wherein the penalty function sum is minimised using stochastic gradient descent optimisation. Stochastic gradient descent optimisation is particularly well suited for the optimisation of penalty functions sums in accordance with the present invention.

According to further aspects of embodiments of the present invention, there are provided an apparatus, a computer program and non-transitory computer readable medium comprising the computer program, which provides the same benefits as discussed above in the context of the method.

DESCRIPTION OF FIGURES

The invention is described, by way of example only, with reference to the following Figures, in which.

DETAILED DESCRIPTION

Figure 1A:
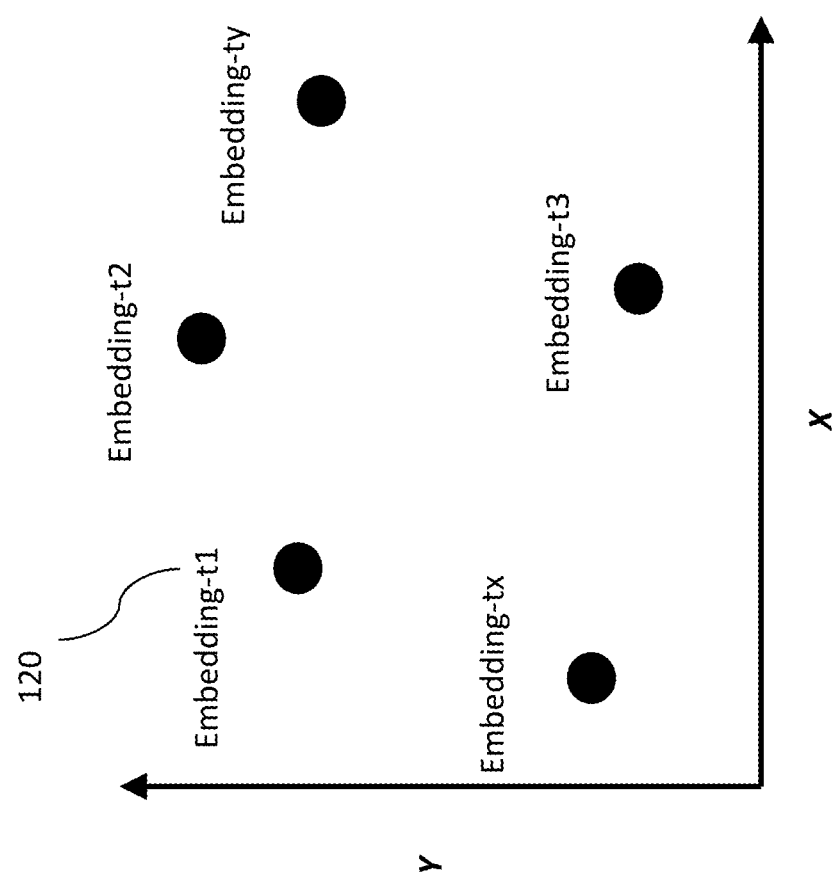
FIG. 1A shows an example of a schema unaware knowledge graph.
Figure 1B:
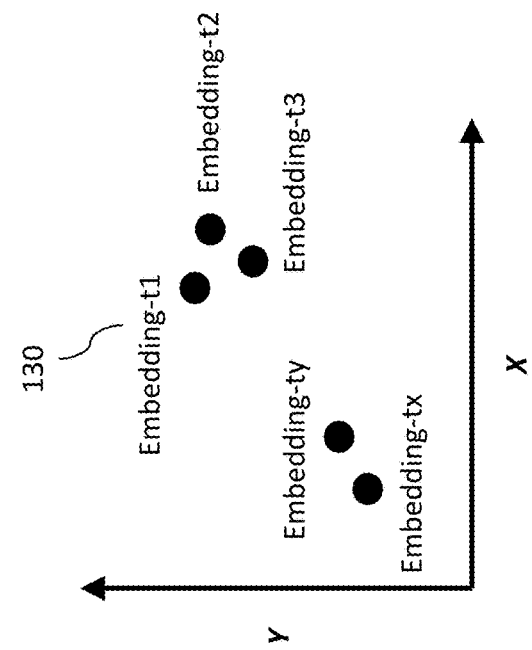
FIG. 1B shows an example of a schema aware knowledge graph.
Figure 1B:
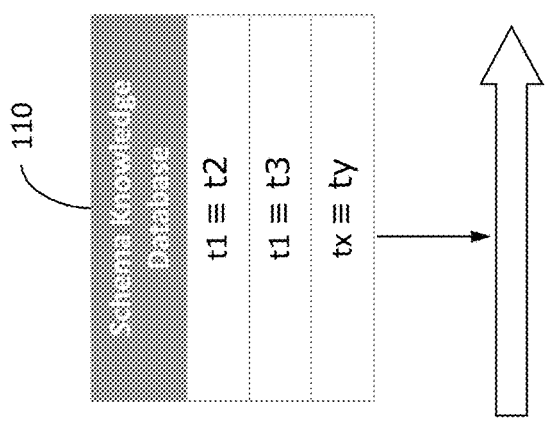
Figure 1B:
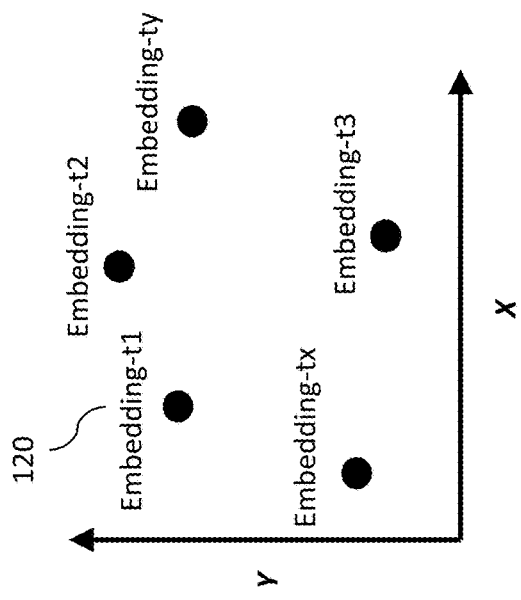
Figure 2:
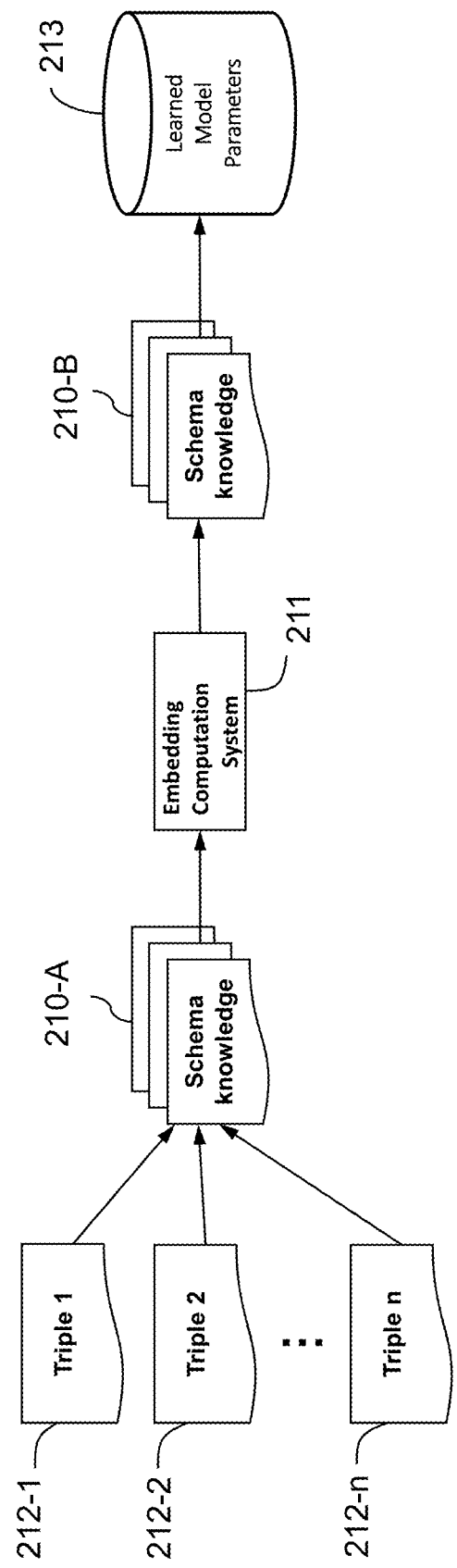
FIG. 2 is a flowchart illustrating prior art techniques for incorporating schema knowledge into knowledge graphs.

The present invention provides an addition to existing schema unaware mechanisms for embedding statements (triples) into knowledge graphs. The following description refers to the use of RDF triples, however the invention is equally applicable to other models that deviate from the RDF requirements. As such, the present invention can be applied to any information (triple) using the <entity, predicate, entity> form.

Non-limiting examples of schema unaware models to which the present invention may be applied include the Translating Embeddings model (TransE), Bilinear-Diagonal model (DistMult) and Complex Embeddings model (ComplEx). The TransE model is discussed in detail in "Translating embeddings for modelling multi-relational data" by Bordes, A. et al., available at https://www.utc.fr/~bordesan/dokuwiki/_media/en/transe_nips13.pdf as of 16 Nov. 2016. The DistMult model is discussed in detail in "Embedding entities and relations for learning and inference in knowledge bases." by Yang, B. et al., available at https://arxiv.org/abs/1412.6575 as of 16 Nov. 2016. The ComplEx model is discussed in detail in "Complex Embeddings for Simple Link Prediction" by Trouillon, T. et al., Proc. of the 33$^{rd}$ International Conference on Machine Learning, 2016. Each of the models discussed herein assigns a prediction score to each statement (corresponding to a triple). The statement likelihood is directly correlated with the prediction score of the statement. A summary of the operation of the models is provided below.

In the Translating Embeddings model (TransE), every entity $e \in E$ and every predicate $p \in R$ are mapped to a unique, continuous embedding vector. The embedding vector of an entity e, and the embedding vector of a predicate p, can then be defined as shown in Equation 3 below.

$$e(e) \in \mathbb{R}^k$$

$$e(p) \in \mathbb{R}^k \quad \text{Equation 3}$$

Using these definitions, the predication score $k<s,p,o>$; $\Theta$) of a <s,p,o> triple is then given by Equation 4, wherein ‖x‖ denotes the L1 or the L2 norm of the vector x, and $\Theta$ denotes the set of parameters of the model (which include the embedding vectors of all entities and predicates in the Knowledge Graph).

$$f(<s,p,o>;\Theta) = -\|e(s)+e(p)-e(o)\| \quad \text{Equation 4}$$

Triples with higher prediction scores are considered more likely than triples with a lower prediction score. As the embedding vectors are not known in advance, the model is typically configured to initialise the embedding vectors at random, and then incrementally update the vectors so to increase the prediction score of triples in the Knowledge Graph (equating to statements verified as true), while decreasing the prediction score of triples not in the graph (equating to statements not verified as true). TransE is an energy based model, and this updating can also be equated to minimising the value of a loss function across all of the triples, thereby attempting to reach minimum of the loss function. This minimum is indicative of the representation of the data deduced to most accurately represent reality.

The Bilinear-Diagonal model (DistMult) is based on the TransE model, as set out above. However, this model is based on multiplicative interactions between the embedding vectors for e and p, rather than the additive interactions used in the TransE model. Accordingly, the prediction score in the DistMult model is obtained as shown in Equation 5. In Equation 5, the right side of the equation indicates the component dot product for e(p) e(s) e(o). As is the case with the TransE model, the embedding vectors are initialised at random.

$$f(\langle s, p, o \rangle; \Theta) = \sum_i e(p)_i e(s)_i e(o)_i \quad \text{Equation 5}$$

The Complex Embeddings model (ComplEx) is, in turn, based on the DistMult model. However, rather than using purely real numbers, the ComplEx model uses complex-valued embeddings while retaining the mathematical definition of the dot product. Accordingly, the prediction score for a statement (triple) is given by Equation 6 wherein, given $x \in \mathbb{C}$ $Re(x) \in \mathbb{R}^k$ indicates the real part of x, and $Im(x) \in \mathbb{R}^k$ indicates the imaginary part of x. As in the case of the TransE and DistMult model, the embedding vectors are once again initialized at random.

$$f(<s,p,o>;\Theta) = \Sigma_i(+Re(e(p)_i),Re(e(s)_i),Re(e(o)_i)+ \\ Re(e(p)_i),Im(e(s)_i),Im(e(o)_i)+Im(e(p)_i),Re(e(s)_i), \\ Im(e(o)_i)-Im(e(p)_i),Im(e(s)_i),Re(e(o)_i))) \quad \text{Equation 6}$$

Inherent in the TransE, DistMult and ComplEx models is the minimisation of a loss function, as discussed above in the context of TransE. The loss function (or cost function) is minimised in order to optimise the representation of the data, thereby arriving at the most accurate knowledge graph representing the relationships between the statements, in the form of a set of optimal model parameters $\Theta^*$. The parameters $\Theta$ of the model once optimised ($\Theta^*$) comprise an embedding vector for each entity and predicate in the knowledge graph, which can be used to complete the knowledge graph.

Loss functions are not model specific, however an example of a loss function which is applicable to all of the TransE, DistMult and ComplEx models is shown in Equation 7, wherein G is the complete set of statements (triples), and C is a function which, when operating on a given triple <s, p, o>, will return all of the triples that can be obtained by replacing one of the entities (s or o) with another entity from G. A user defined parameter is denoted by $\gamma \in \mathbb{R}$.

$$L(\Theta) = \sum_{t \in G} \sum_{u \in C(t)} \max\{0, \gamma + f(u; \Theta) - f(t; \Theta)\} \quad \text{Equation 7}$$

The optimal parameters are found by minimising the loss function, that is, according to $\Theta^* = \text{argmin}_\Theta L(\Theta)$. This is true regardless of the specific form of the loss function used.

In prior art systems, no consideration is made during the optimisation of the parameters for the schema knowledge (all of the models discussed above are schema unaware). The present invention provides modifications for loss functions (such as the loss function shown in Equation 7) to take into account schema knowledge. This is achieved through the use of additional constraints imposed when minimising the loss function to arrive at the optimal parameters.

In order to allow the additional constraints to be explained, it is necessary to define two sets of axioms, $A_1$ and $A_2$. $A_1$ is a set containing all of the schema equivalence axioms, and $A_2$ is a set containing all of the schema inverse axioms. These two sets can be defined mathematically as shown in Equation 8 below, where p and q are predicates.

$$A_1 = \{p_1 \equiv q_1, \ldots, p_m \equiv q_m\} \text{ and } A_2 = \{p_{m+1} \equiv q^-_{m+1}, \ldots, p_n \equiv q^-_n\} \quad \text{Equation 8}$$

Given the axiom sets $A_1$ as defined in Equation 8, the invention applies the constraint that, for all entities s, o $\in$ E where p$\equiv$q, the scores f(<s,p,o>; $\Theta$) and f(<s,q,o>; $\Theta$) should be the same by favouring that p and q have the same embedding, i.e. e(p)=e(q). Instead of imposing a distinct constraint f(<s,p,o>; $\Theta$)=f(<s,q,o>; $\Theta$), for each entity, a single constraint e(p)=e(q) is imposed on the predicate embeddings e(p) and e(q). In this way, the equivalence axioms are respected.

Given the axiom set $A_2$, as also defined in Equation 8, the invention applies the constraint that, for all entities s, o$\in$E where p$\equiv$q$^-$, the scores f(<s,p,o>; $\Theta$) and f(<o,q,s>; $\Theta$) should be the same. In order to obtain this result with a number of constraints that is not influenced by the number of entities in the knowledge graph, a model-dependent function $\phi: \mathbb{R}^k \rightarrow \mathbb{R}^k$ is defined. By applying e(p)=$\phi$(e(q)), the model-dependent function favours that for any pair of entities s, o$\in$E, the score of <s, o> and <o, q, s> is the same: f(<s,p,o>; $\Theta$)=f(<o,q,s>; $\Theta$).

Strict enforcement of the constraints related to the axioms in the sets $A_1$ and $A_2$, requires the use of hard constraints (inviolable constraints). The use of hard constraints in this way can efficiently adapt the embedding of the vectors to take into account the schema knowledge, however it is limited to use with absolutely verified data equivalent or inverse relationships. That is, the use of hard constraints in this way would reduce the ability of embodiments of the invention to take into account relationships indicating that two predicates, although not directly equivalent or inverse of one another, have related meanings. An example of related predicates is the case of the predicates Married With and Partner Of: although not equivalent they have related meanings, and if <s, Married With, o> is true, then <s, Partner Of, o> is more likely to also be true. However, although <s, Partner Of, o> is more likely to also be true in this situation, the probability of validity is not as high as if the two predicates were exact equivalents of one another.

In order to allow related predicates to be taken into consideration, embodiments of the present invention may also use soft constraints, which are used to define desired properties which are favoured, but which are not inviolable. So that the nature of relationship between two predicates can be taken into consideration, in particular how similar (or inverse to) one another two predicates are, embodiments of the present invention apply a weighting factor ($\lambda$) to the constraints. The weighting factor ($\lambda$) is essentially a measure of the importance of any given relationship between predicates. For more similar (or inverse to one another) predicates, the weighting factor is large so that any deviation from the ideal values as defined above (for equivalence: f(<s,p,o>; $\Theta$)=f(<s,q,o>; $\Theta$), and for inverses f(<s,p,o>; $\Theta$)=f(<o,q,s>; $\Theta$)) has a significant impact on the loss factor (as defined below). For predicates where there is a less strong relationship, the weighting factor is smaller such that any deviation from the ideal values has a less significant impact on the loss factor. For hard constraints, the weighting factor ($\lambda$) may be maximal, to reflect the relative importance of the hard constraints as discussed above.

In order to incorporate the weighted constraints into the loss factor, the present invention modifies an existing loss factor (such as the loss factor shown in Equation 7) to include an additional penalty function term $R_S(\Theta)$, as shown in Equation 9. The value of $R_S(\Theta)$ is the unweighted penalty function sum; a sum of the unweighted penalty function values for all of the embedding vectors.

$$R_S(\Theta) = \sum_{p \equiv q \in A_1} D(e(p) \| e(q)) + \sum_{p \equiv q^- \in A_2} D(e(p) \| \phi(e(q))) \quad \text{Equation 9}$$

In Equation 9, the first summation term penalizes (increases the score according to) the dissimilarity between the embedding of p, e(p), and the embedding of q, e(q), when the two predicates are identified as equivalent (by the schema equivalence axioms from set $A_1$). The second summation term penalizes the dissimilarity between the embedding of p, e(p), and a transformation of the embedding of q, $\phi$(e(q)), when the two predicates are identified as inverses of one another (by the schema equivalence axioms from set $A_2$). The transformation function $\phi(\cdot)$ is derived analytically for each embedding model in such a way that for each pair of entities s,o $\in$E, the triples <s, p, o> and <o, q, s> are associated to the same score, as discussed above.

In Equation 9, the notation $D(x\|y)$ indicates a measure of the dissimilarity between two vectors (x and y). In an aspect of an embodiment of the present invention, $D(x\|y)=\|x-y\|_2$, however other forms for measuring the similarity between two vectors such as cosine similarity measurements can also be used.

The cosine similarity is a measure of similarity between two vectors, and is calculated using Equation 10 wherein A and B are vectors, each having n components. The symbols $A_i$ and $B_i$ indicate the ith components of A and B respectively.

$$\cos\theta = \frac{A \cdot B}{|A\|B|} = \frac{\sum_{i=1}^{n} A_i B_i}{\sqrt{\sum_{i=1}^{n} A_i^2} \sqrt{\sum_{i=1}^{n} B_i^2}} \quad \text{Equation 10}$$

The output from Equation 10 is the cosine similarity value, which is a value between 0 and 1 that indicates the similarity between the two input vectors, wherein a value of 1 Indicates that the comparison was made between two identical vectors, and lower values indicate that the comparison was between more dissimilar vectors.

Using the equation for $R_S(\Theta)$ as shown in Equation 9, an existing loss function (for example, the function shown in Equation 7) can be modified to take into account the weighted soft constraints, by including the weighting factors ($\lambda$) for the axioms, to return the penalty function sum $\lambda R_S(\Theta)$. The penalty function sum is the sum of weighted penalty function values for all of the predicates and associated entities, the penalty function values being: inversely proportional to the similarity between assigned vectors for two predicates identified as being equivalent to one another; directly proportional to the dissimilarity between assigned vectors for two predicates identified as inverses of one another; and weighted according to the degree of correlation between predicates that are identified as being related.

The resulting modified loss function in accordance with an aspect of the present invention is denoted by the symbol $L_S$, and is given by Equation 11 as shown below.

$$L_S(\Theta)=L(\Theta)+\lambda R_S(\Theta) \quad \text{Equation 11}$$

Aspects of embodiments of the present invention utilise gradient descent algorithms to optimise $L_S$, that is, to minimising the loss function according to $\Theta^*=\text{argmin}_\Theta L(\Theta)$ and obtain the set of optimal model parameters $\Theta^*$. Stochastic gradient descent algorithms are particularly well suited to the optimisation required for embodiments of the present invention, because this method will recalculate the modified loss function after each embedding vector variation. However, other algorithms such as batch or mini-batch gradient descent algorithms can also be used.

Figure 3:
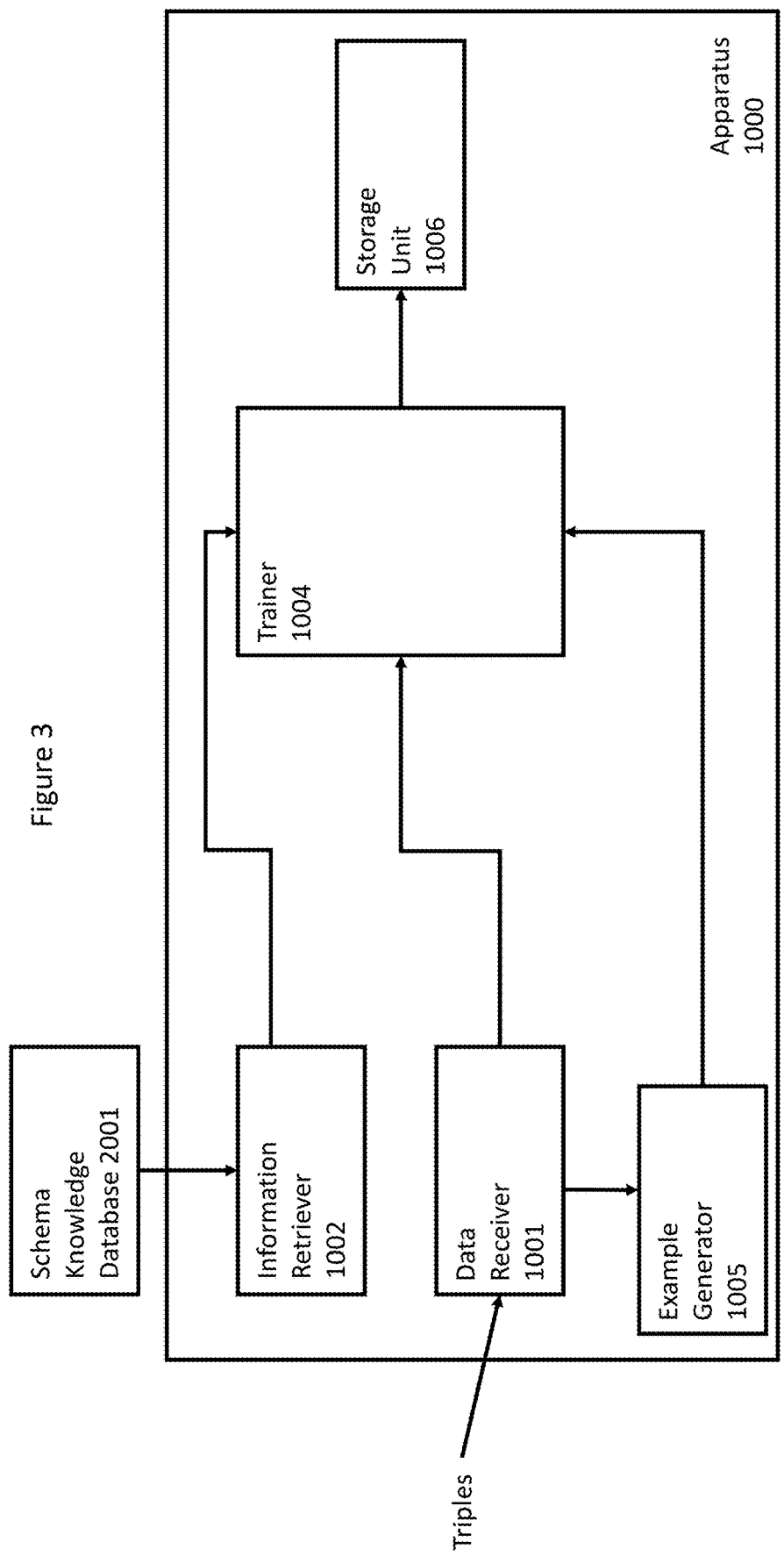
FIG. 3 is a schematic of an apparatus in accordance with an aspect of an embodiment of the present invention.

A schematic of an apparatus 1000 in accordance with embodiments of the present invention is shown in FIG. 3. In operation, the apparatus 1000 receives a plurality of predicates and associated entities, in the form of a plurality of triples. As discussed above, the triples may be RDF triples, although this is not an essential feature of the invention. The predicates and associated entities are received by a data receiver 1001. The data receiver 1001 may receive the predicates and associated entities via manual input from a user (for example, by keyboard entry), however typically the predicates and associated entities are provided in a data file. The data file may be received via an internet connection or may be uploaded to the apparatus via a physical storage device, such as a hard drive or optical disk.

The apparatus 1000 also retrieves schema knowledge from a schema knowledge database 2001. In the aspect of an embodiment of the invention shown in FIG. 3 the schema knowledge database 2001 is separate from the apparatus 1000, and the schema knowledge is retrieved by an information retriever 1002 from the schema knowledge database 2001 via a connection to the remote schema knowledge database 2001. In aspects of embodiments of the present invention, the schema knowledge database 2001 is stored on a remote server, connected to the apparatus 1000 either via the internet or via a dedicated data connection that is isolated from the internet. However, in alternative aspects of embodiments of the invention, the schema knowledge database 2001 is incorporated within the apparatus 1000, and the information retriever 1002 is responsible for extracting the required schema knowledge directly from the local database. Optionally, a local schema knowledge database 2001 may periodically synchronise with a remote schema knowledge database. The information retriever is responsible for obtaining relevant schema knowledge, that is, axioms identifying predicates among the plurality of predicates (obtained by the data receiver 1001) that are equivalent to one another, or inverses of one another.

The schema knowledge and the predicates and associated entities are then passed to a trainer 1004, which assigns embedding vectors to the predicates and associated entities to complete the knowledge graph. As discussed in greater detail above, this assignment of embedding vectors is performed such that the penalty function sum is minimised, the penalty function values for a given predicate and associated entities being: inversely proportional to the similarity between assigned vectors for two predicates identified by the information retriever 1002 as being equivalent to one another; directly proportional to the dissimilarity between assigned vectors for two predicates identified by the information retriever 1002 as inverses of one another; and weighted according to the degree of correlation between predicates that are identified as being related.

Optionally, the trainer 1004 may communicate with an example generator 1005 when performing the assignment of embedding vectors. The example generator 1005 is particularly of use in aspects of embodiments of the invention that adhere to the open world assumption (as discussed above), such as those aspects that receive as an input triples in accordance with the RDF requirements. In accordance with the open world assumption, a triple not in the RDF graph does not necessarily encode a false statement, but rather it is not known if the corresponding statement is true or false. In certain knowledge graph embedding models with which the present invention may be utilised, entity and predicate embeddings are learned by incrementally increasing the score of triples in the graph, while lowering the score of triples not in the graph that are considered less likely to encode true statements. The example generator 1005 is configured to: analyse the Resource Description Framework statements that are to be used to complete the knowledge graph; identify Resource Description Framework statements are absent; determine which of the identified absent Resource Description Statements is likely to be false based on the analysis, wherein the absence of a given Resource Description Framework statement from the information used to complete the knowledge graph is not automatically interpreted as meaning that the given Resource Description Framework is false; and adjust the embedding of the Resource Description Framework statements that are to be used to complete the knowledge graph on the basis of the determination (in conjunction with the trainer 1004). In doing so, the example generator 1005 allows the optimisation process to be performed in a more efficient way.

The apparatus 1000 may also optionally include a storage unit 1006 used to store the optimal model parameters, that is, the optimal embedding vector for each entity and predicate, once the optimal model parameters have been identified. In the aspect of an embodiment of the invention shown in FIG. 3, the storage unit 1006 comprises a hard disk which is part of the apparatus 1000, allowing the optimal model parameters to be stored locally such that the knowledge graph can be retrieved and manipulated quickly. Alternatively, the apparatus 1000 may be configured to transfer the optimal model parameters to a remote location (such as a server), either via the internet or via another means.

The optimal model parameters can be used for various purposes once the knowledge graph has been completed. One way of utilising these parameters is in the generation of additional triples. By analysing the optimal model parameters, the trainer 1004 can be configured to generate additional triples, not included in the initial information received by the data receiver 1001, that the completed knowledge graphs indicates are correct (true). These additional triples can be outputted for human verification. This process is also referred to as link prediction.

The application of the present invention to link prediction is of particular value when embodiments of the invention are used for completing databases. This is especially true for situations wherein there are equivalent and inverse properties in a single dataset, or wherein a database is formed by combining data from multiple datasets (which may not necessarily include the same fields). Example situations include population databases, medical databases, financial or commercial databases and the like.

Figure 4:
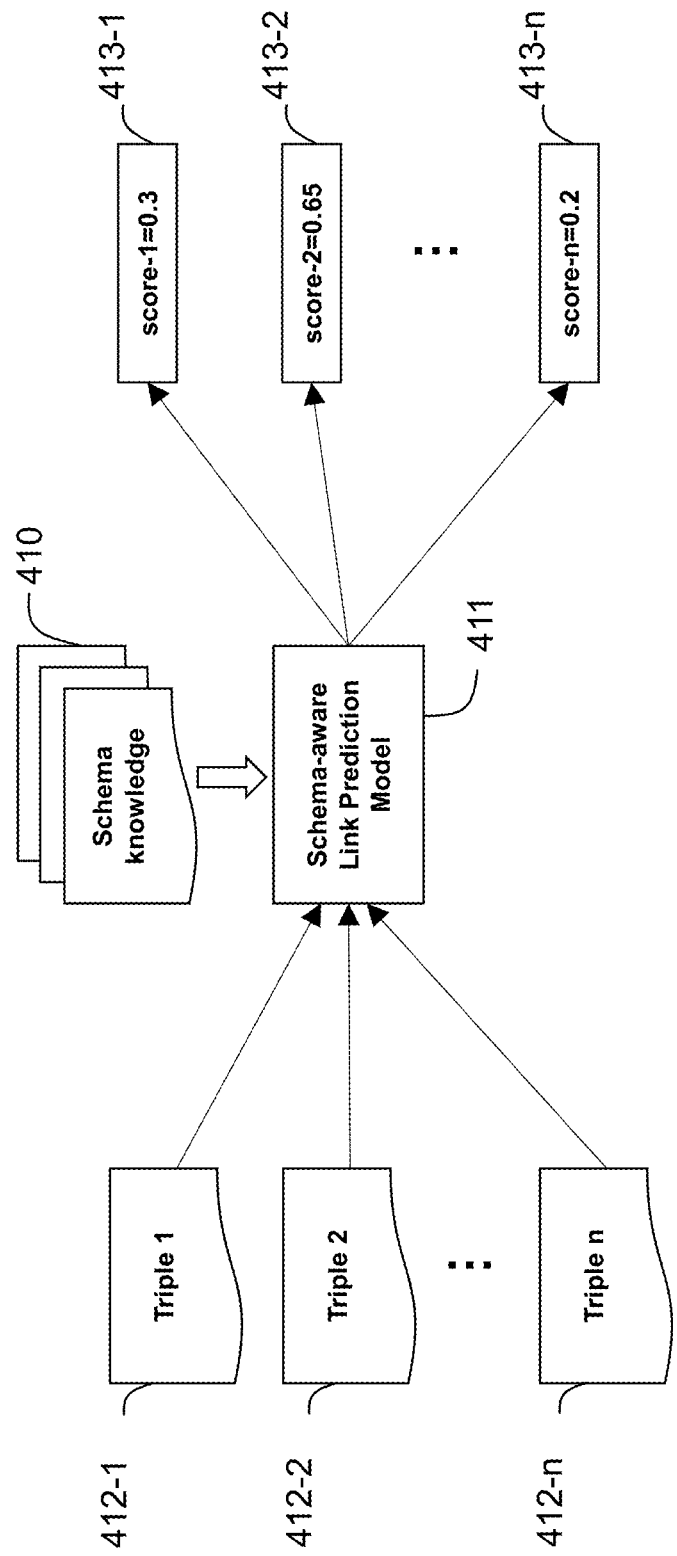
FIG. 4 is a flowchart of an example of link predication in accordance with an aspect of an embodiment of the present invention.

FIG. 4 is a flowchart showing an example implementation of the invention for link prediction. A generalised (schema unaware) link prediction model is modified taking into account the provided schema knowledge 410, and a new link prediction model 411 is generated. The new model 411 takes into account the schema knowledge 410 when assigning scores to the input triples 412-1 to 412-*n*, such that the imposed constraints (equivalences and inverse equivalences) are satisfied. The new, schema aware model 411 generates scores 413-1 to 413-*n* such that the triples influenced by the constraints now receive similar scores.

Figure 5:
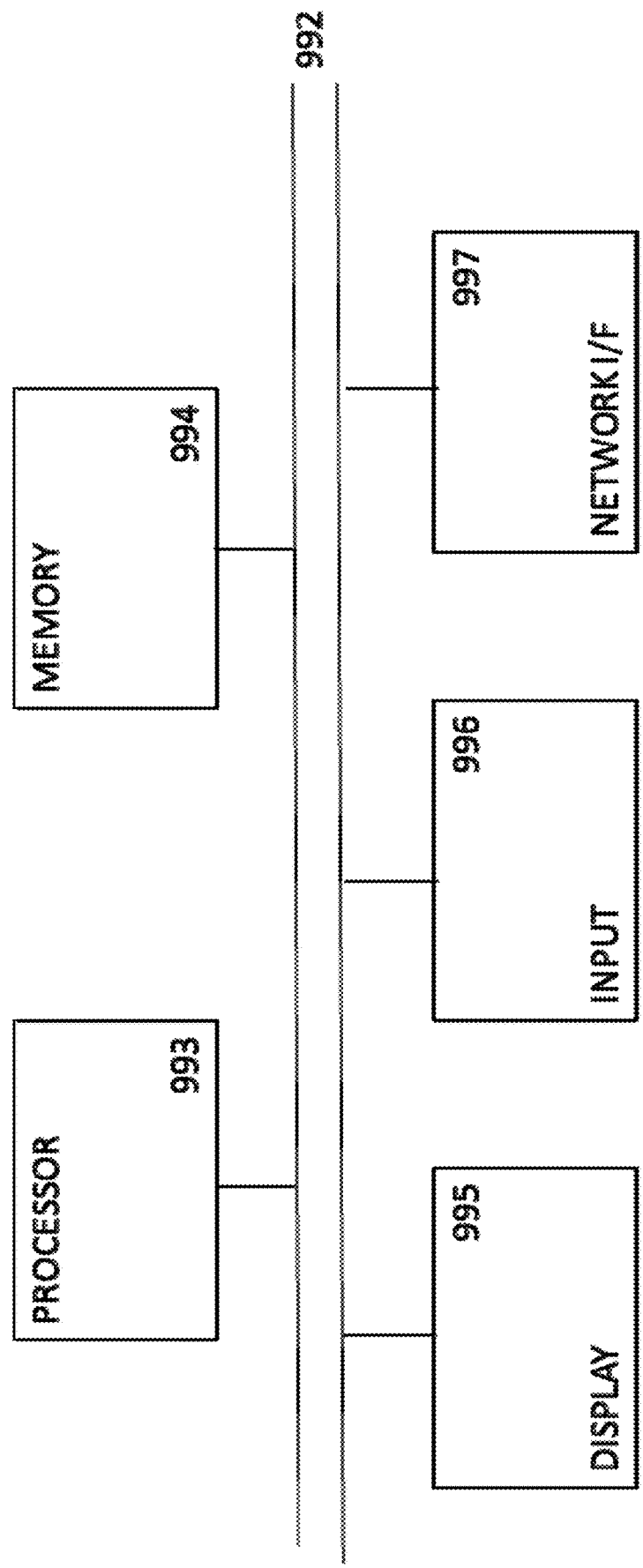
FIG. 5 is a block diagram of a computing device which embodies an aspect of an embodiment of the present invention.

FIG. 5 is a block diagram of a computing device, such as a personal computer, which embodies an aspect of an embodiment of the present invention, and which may be used to implement an embodiment of the method for completing a knowledge graph from a plurality of predicates and associated entities. The computing device comprises a processor 993, and memory 994. Optionally, the computing device also includes a network interface 997 for communication with other computing devices, for example with other computing devices of invention embodiments, or for computing with remote databases.

For example, an aspect of an embodiment of the invention may be composed of a network of such computing devices, such that components of the apparatus 1000 are split across a plurality of computing devices. Optionally, the computing device also includes one or more input mechanisms such as keyboard and mouse or touchscreen interface 996, and a display unit such as one or more monitors 995. The components are connectable to one another via a bus 992.

The memory 994 may include a computer readable medium, which term may refer to a single medium or multiple media (e.g., a centralized or distributed database and/or associated caches and servers) configured to carry computer-executable instructions or have data structures stored thereon. Computer-executable instructions may include, for example, instructions and data accessible by and causing a general purpose computer, special purpose computer, or special purpose processing device (e.g., one or more processors) to perform one or more functions or operations. Thus, the term "computer-readable storage medium" may also include any medium that is capable of storing, encoding or carrying a set of instructions for execution by the machine and that cause the machine to perform any one or more of the methods of the present disclosure. The term "computer-readable storage medium" may accordingly be taken to include, but not be limited to, solid-state memories, optical media and magnetic media. By way of example, and not limitation, such computer-readable media may include non-transitory computer-readable storage media, including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices).

The processor 993 is configured to control the computing device and execute processing operations, for example executing code stored in the memory to implement the various different functions of the data receiver 1001, information retriever 1002, trainer 1004 and, optionally, schema knowledge database 2001, example generator 1005 and storage unit 1006 described here and in the claims. The memory 994 stores data being read and written by the processor 993. As referred to herein, a processor may include one or more general-purpose processing devices such as a microprocessor, central processing unit, or the like. The processor may include a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor may also include one or more special-purpose processing devices such as an application specific integrated circuit (ASIC), a field programmable gate array (FPGA), a digital signal processor (DSP), network processor, or the like. In one or more embodiments, a processor is configured to execute instructions for performing the operations and steps discussed herein.

The display unit 997 may display a representation of data stored by the computing device and may also display a cursor and dialog boxes and screens enabling interaction between a user and the programs and data stored on the computing device. The display unit may also comprise a touchscreen interface. The input mechanisms 996 may enable a user to input data and instructions to the computing device. In particular, the display unit may be used to display knowledge graphs completed using the present invention, received schema knowledge, input triples, derived triples, and so on.

The network interface (network I/F) 997 may be connected to a network, such as the Internet, and is connectable to other such computing devices via the network. The network I/F 997 may control data input/output from/to other apparatus via the network.

Other peripheral devices such as microphone, speakers, printer, power supply unit, fan, case, scanner, trackerball etc. may be included in the computing device.

The data receiver 1001 of FIG. 3 may be a processor 993 (or plurality thereof) executing processing instructions (a program) stored on a memory 994 and exchanging data via a network I/F 997 or bus 992. In particular, the processor 993 can execute processing instructions to receive triples (predicates and associated entities), as discussed above. Furthermore, the processor 993 may execute processing instructions to store the received triples on a connected storage unit and/or to transmit, via the network I/F 997 or bus 992, the triples to other components within the apparatus 1000.

The information retriever 1002 of FIG. 3 may be a processor 993 (or plurality thereof) executing processing instructions (a program) stored on a memory 994 and exchanging data via a network I/F 997 or bus 992. In particular, the processor 993 can execute processing instructions to retrieve relevant schema knowledge from a schema knowledge database 2001, as discussed above. Furthermore, the processor 993 may execute processing instructions to store the received schema knowledge on a connected storage unit and/or to transmit, via the network I/F 997 or bus 992, the schema knowledge to other components within the apparatus 1000.

The trainer 1004 of FIG. 3 may be a processor 993 (or plurality thereof) executing processing instructions (a program) stored on a memory 994 and exchanging data via a network I/F 997 or bus 992. In particular, the processor 993 can execute processing instructions to embed the identified predicates and associated entities into a vector space to complete the knowledge graph, in accordance with the minimisation of the penalty function sum as discussed above. Furthermore, the processor 993 may execute processing instructions to store the knowledge graph (optimal model parameters) on a connected storage unit and/or to transmit, via the network I/F 997 or bus 992, the knowledge graph to other components within the apparatus 1000 or elsewhere.

Methods embodying the present invention, may be carried out on one or more computing devices such as that illustrated in FIG. 5. Such a computing device need not have every component illustrated in FIG. 5, and may be composed of a subset of those components. A method embodying the present invention may be carried out by a single computing device in communication with one or more data storage servers via a network, as discussed above.

As embodiments of the present invention are configured to incorporate schema knowledge in the process of assigning the embedding vectors, the resulting knowledge graphs more accurately represent the relationships between input triples than knowledge graphs generated by existing, schema unaware methods. Further, because the present invention avoids the use of post-processing schema knowledge implementation, the number of constraints required does not increase exponentially and the present invention can therefore be applied to large data sets without requiring unreasonable computing resources. The present invention therefore provides an accurate and (computing) resource efficient method and apparatus for completing knowledge graphs. As discussed above, the method may be implemented using a computer program, which may be stored on a non-transitory computer readable medium.

What is claimed is:

1. A computer implemented method of completing and utilizing a knowledge graph from a plurality of predicates and associated entities, the predicates each providing information on a relationship between a pair of entities, the method comprising:
receiving an input comprising the plurality of predicates and respective corresponding entities associated with the predicates;
searching an axiom database and identifying predicates among the plurality of predicates that are equivalent to one another, or inverses of one another;
identifying other predicates that are related to one another to be included with the identified predicates, using the axiom database and the identified predicates; and
embedding the identified predicates and the respective corresponding associated entities by assignment to vectors in a vector space to complete the knowledge graph, wherein an identified predicate and a corresponding associated entity, among the predicates and the respective corresponding associated entities, is assigned a vector, among the vectors in the vector space, in the embedding such that a penalty function sum, which is a sum of penalty function values for a plurality of identified predicates and respective corresponding associated entities, among the identified predicates and the respective corresponding associated entities, is minimised, the penalty function values being:
inversely proportional to a similarity between assigned vectors for two predicates, among the identified predicates, identified as being equivalent to one another;
directly proportional to a dissimilarity between assigned vectors for two predicates, among the identified predicates, identified as inverses of one another; and
weighted according to a degree of correlation between predicates, among the identified predicates, that are identified as being related,
wherein,
the identified predicates and the respective corresponding associated entities are utilized in the embedding in form of Resource Description Framework (RDF) statements,
each RDF statement of the RDF statements including a subject portion, a predicate portion, and an object portion,
the subject portion and the object portion describing a corresponding associated entity, among the respective corresponding associated entities, and the predicate portion describing a relationship between the subject portion and the object portion, and the method further includes,
analyzing the RDF statements to be used to complete the knowledge graph and identifying RDF statements that are absent;
determining a RDF statement, among the identified absent RDF statements, that is likely to be false based on the analyzing;
adjusting the embedding of the RDF statements to be used to complete the knowledge graph on basis of the determining; and
utilizing the embedding of the RDF statements from the completed knowledge graph to generate additional RDF statements, and completing a database utilizing the additional RDF statements.

2. The method of claim 1, wherein in the determining, the absence of the RDF statement from information used to complete the knowledge graph is not automatically interpreted as meaning that the RDF statement is false.

3. The method of claim 1, wherein the penalty function sum is of form:

$$R_S(\theta) = \sum_{p=q \in A_1} D(e(p)\|e(q)) + \sum_{p=q^- \in A_2} D(e(p)\|\phi(e(q)))$$

wherein:
$\Theta$ is the parameters of the model used to complete the knowledge graph;
p and q are predicates;
$A_1$ is a set containing all of the schema equivalence axioms;
$A_2$ is a set containing all of the schema inverse axioms;
e(x) is the embedding vector of x;
□ is a model dependent transformation function; and
D (x∥y) is a measure of the dissimilarity between two given vectors x and y.

4. The method of claim 1, further comprising storing the assigned vectors found to minimise the penalty function sum.

5. The method of claim 4, further comprising identifying additional RDF statements based on the assigned vectors found to minimise the penalty function sum, and updating the knowledge graph using the additional RDF statements.

6. The method of claim 1, wherein the penalty function sum is minimised using stochastic gradient descent optimisation.

7. An apparatus comprising:
a memory to store a computer program; and
a computer processor to execute the computer program to,
obtain an input comprising a plurality of predicates and respective corresponding entities associated with the predicates;
search an axiom database and identify predicates among the plurality of predicates that are equivalent to one another, or inverses of one another;
identify, using a trainer, other predicates that are related to one another to be included with the identified predicates, using the axiom database and the identified predicates, and embed the identified predicates and the respective corresponding associated entities by assignment to vectors in a vector space to complete the knowledge graph, wherein the trainer is further configured to assign an identified predicate and a corresponding associated entity, among the predicates and the respective corresponding associated entities, to a vector, among the vectors in the vector space such that a penalty function sum, which is a sum of penalty function values for a plurality of identified predicates and respective corresponding associated entities, among the identified predicates and the respective corresponding associated entities, is minimised, the penalty function values being:

inversely proportional to a similarity between assigned vectors for two predicates, among the identified predicates, identified by the information retriever as being equivalent to one another;

directly proportional to a dissimilarity between assigned vectors for two predicates, among the identified predicates, identified by the information retriever as inverses of one another; and weighted according to a degree of correlation between predicates, among the identified predicates, that are identified as being related, wherein, the identified predicates and the respective corresponding associated entities are utilized in the embedding in form of Resource Description Framework (RDF) statements, each RDF statement of the RDF statements including a subject portion, a predicate portion, and an object portion, the subject portion and the object portion describing a corresponding associated entity, among the respective corresponding associated entities, and the predicate portion describing a relationship between the subject portion and the object portion, and the computer processor is to further execute the computer program to, analyze the RDF statements to be used to complete the knowledge graph and identifying RDF statements that are absent;

determine a RDF statement, among the identified absent RDF statements, that is likely to be false based on the analyzing;

adjust the embedding of the RDF statements to be used to complete the knowledge graph on basis of the determining; and utilize the embedding of the RDF statements from the completed knowledge graph to generate additional RDF statements, and completing a database utilizing the additional RDF statements.

8. The apparatus of claim 7, wherein the computer processor is to further execute the computer program to store the assigned vectors found to minimise the penalty function.

9. The apparatus of claim 7, wherein the trainer is configured to minimise the penalty function sum using stochastic gradient descent optimisation.

10. A non-transitory computer readable medium comprising a computer program in accordance with claim 7.

* * * * *